United States Patent
Mejia et al.

(10) Patent No.: US 10,401,928 B2
(45) Date of Patent: *Sep. 3, 2019

(54) INTERFACE FOR COMMUNICATION BETWEEN CIRCUIT BLOCKS OF AN INTEGRATED CIRCUIT, AND ASSOCIATED APPARATUSES, SYSTEMS, AND METHODS

(71) Applicant: INTEL CORPORATION, Santa Clara, CA (US)

(72) Inventors: Ivan Herrera Mejia, Folsom, CA (US); Zeev Offen, Folsom, CA (US)

(73) Assignee: INTEL CORPORATION, Santa Clara, CA (US)

( * ) Notice: Subject to any disclaimer, the term of this patent is extended or adjusted under 35 U.S.C. 154(b) by 164 days.

This patent is subject to a terminal disclaimer.

(21) Appl. No.: 15/455,059

(22) Filed: Mar. 9, 2017

(65) Prior Publication Data
US 2017/0242708 A1    Aug. 24, 2017

Related U.S. Application Data (63) Continuation of application No. 14/140,219, filed on Dec. 24, 2013, now Pat. No. 9,594,413.

(51) Int. Cl.
*G06F 1/26* (2006.01)
*G06F 1/24* (2006.01)
(Continued)

(52) U.S. Cl.
CPC .............. *G06F 1/26* (2013.01); *G06F 1/24* (2013.01); *G06F 1/324* (2013.01); *G06F 1/3243* (2013.01); *G06F 1/3296* (2013.01); *G06F 9/24* (2013.01); *G06F 9/4418* (2013.01); *Y02D 10/126* (2018.01); *Y02D 10/172* (2018.01); *Y02D 50/20* (2018.01)

(58) Field of Classification Search
CPC ........ G06F 1/3202; G06F 1/3231; G06F 1/26; G06F 1/206; G06F 1/3228; G06F 1/08; G06F 1/3289; G06F 1/266; H04L 12/12; H04L 12/10
See application file for complete search history.

(56) References Cited

U.S. PATENT DOCUMENTS 6,226,756 B1    5/2001   Mueller
7,036,098 B2    4/2006   Eleyan et al.
(Continued)

OTHER PUBLICATIONS

Non-Final Office Action dated Dec. 9, 2015, issued in related U.S. Appl. No. 14/140,219, 17 pages.
(Continued)

*Primary Examiner* — Zahid Choudhury
(74) *Attorney, Agent, or Firm* — Schwabe, Williamson & Wyatt, P.C.

(57) ABSTRACT

Embodiments including systems, methods, and apparatuses associated providing an interface between a north complex and a south complex of a system on a chip (SoC). In embodiments, the north complex may include a microcontroller in an input signal requirement. A power-on control block may be coupled with the microcontroller, and the power-on control block may be configured to receive a control signal from a component of the south complex, and alter the control signal based at least in part on the input signal requirement of the microcontroller.

25 Claims, 4 Drawing Sheets

(51) Int. Cl.
    *G06F 1/32*      (2019.01)
    *G06F 1/324*     (2019.01)
    *G06F 1/3296*    (2019.01)
    *G06F 1/3234*    (2019.01)
    *G06F 9/24*      (2006.01)
    *G06F 9/4401*    (2018.01)

(56) References Cited

U.S. PATENT DOCUMENTS

| | | |
|---|---|---|
| 8,566,628 B2 | 10/2013 | Branover et al. |
| 2005/0283561 A1* | 12/2005 | Lee .................. G06F 1/206 |
| | | 710/307 |
| 2007/0283059 A1* | 12/2007 | Ho .................... G06F 13/102 |
| | | 710/104 |
| 2008/0228985 A1 | 9/2008 | Gulick |
| 2008/0276105 A1 | 11/2008 | Hoberman et al. |
| 2013/0332748 A1 | 12/2013 | Kolla et al. |
| 2015/0171130 A1 | 6/2015 | Lee et al. |

OTHER PUBLICATIONS

Final Office Action dated Jul. 11, 2016, issued in related U.S. Appl. No. 14/140,219, 14 pages.
Notice of Allowance dated Nov. 7, 2016, issued in related U.S. Appl. No. 14/140,219, 9 pages.

\* cited by examiner

INTERFACE FOR COMMUNICATION BETWEEN CIRCUIT BLOCKS OF AN INTEGRATED CIRCUIT, AND ASSOCIATED APPARATUSES, SYSTEMS, AND METHODS

CROSS-REFERENCE TO RELATED APPLICATION

This application is a continuation of U.S. application Ser. No. 14/140,219, filed Dec. 24, 2013, entitled "NORTH COMPLEX/SOUTH COMPLEX INTERFACE," now U.S. Pat. No. 9,594,413. The disclosure of application Ser. No. 14/140,219 is hereby incorporated by reference herein in its entirety for all purposes.

FIELD

Embodiments of the present invention relate generally to the technical field of system on a chip (SoC) architecture.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure. Unless otherwise indicated herein, the approaches described in this section are not prior art to the claims in the present disclosure and are not admitted to be prior art by inclusion in this section.

In a system on a chips (SoC) architecture, the platform controller hub (PCH) and a processing unit or processor such as a central processing unit (CPU) or graphics processing unit (GPU) may be integrated on the same die. In general, the PCH and related components or functions may be part of a south complex of the die, and the CPUs or GPUs may be part of a north complex of the die.

In embodiments, the PCH may be able to transmit one or more signals from the south complex to the north complex via one or more wires or pins. In some embodiments, the specific configuration of the signals or the wires may presume a specific type of north complex control structure. Therefore, in some embodiments it may be desirable to pair a specific south complex control structure with a specific north complex component. However, in some embodiments the north complex may not be equipped with the control structure necessary to receive the signals from the south complex.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

DETAILED DESCRIPTION

In the following detailed description, reference is made to the accompanying drawings, which form a part hereof wherein like numerals designate like parts throughout, and in which is shown by way of illustration embodiments that may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

Apparatuses, methods, and storage media associated with a north complex/south complex interface for a system on a chip (SoC) are illustrated. Legacy chips utilizing processors such as central processing units (CPUs) or graphics processing units (GPUs) used signals such as powerok/xxpowergood and xxReset# as the primary Power On and Reset synchronization signals with a separate platform controller hub (PCH). However, in some legacy SoCs, one or more processors such as CPUs or GPUs and a PCH may be integrated on the same die. In these integrated SoCs, the PCH may be referred to as the south complex, and the CPU and/or GPU and related subsystems may be referred to as a north complex. In embodiments, the interface between the south complex and the north complex may use parallel transmission lines over which a three-bit encoded signal may be sent. In some embodiments, the transmission lines may be referred to as PowerMode [2:0] pins or simply PowerMode pins or pins.

The PowerMode pins may be asynchronous. That is, the south complex may not be synchronized to one or more other components of the north complex of the SoC. Therefore, the south complex may be configured to transmit an internal signal such as a Reset signal to a component of the north complex. The received signal may be synchronized to a clock of the SoC such as a reference clock once it is decoded from the PowerMode pins. Therefore, an internal reset de-assertion may be considered to be deterministic and synchronous to the reference clock.

The PCH or south complex may include a power management controller (PMC) that may be responsible for driving the PowerMode[2:0] pins. That is, the PMC may write to one or more registers in the PMC block, which may result in the pins carrying one or more signals from the north complex. For example, the PMC may implement a firmware writable register which has glue logic responsible for synchronization with one or more clocks, and the logic may be further responsible for translating firmware commands into 3-bit encoding values on the PowerMode Pins. Specifically, the PMC may drive the pins to assist the north complex in changing to or from, for example, a "cold," "warm," or "standby" mode. In some embodiments, the transition from one mode to another may be subject to specific time requirements.

However, this interface described above where the PMC drives the one or more pins may be undesirable in some embodiments. Specifically, the interface described above may prevent reuse between components of SoCs designed for use in a specific client type system such as a desktop client and components of SoCs designed for use in a phone or tablet type application. Reuse may be prevented because the signals from the PMC may be formatted differently, have a different signal characteristic such as timing, frequency, or power, or have a different number of signals than components of the north complex are designed to accept. For example, in some embodiments it may be highly desirable to have the option of combining a power- or performance-efficient CPU in a north complex designed for use in a client type system with a low-power south complex designed for use in a phone or tablet type system. Embodiments described herein introduce one or more components or processes that may allow this potentially desirable combination through a unified interface. By unifying the interface and allowing components of a specific south complex to be integrated with components of a specific north complex, it may become possible to achieve combinations between different north complex and south complex architecture or components.

In embodiments described herein a power-on control block in the north complex may be coupled with a microcontroller of the north complex. The power-on control block may be configured to receive a control signal from a component of the south complex such as a PMC, and alter the control signal based at least in part on the input signal requirement of the microcontroller. Additionally or alternatively, the power-on control block may be configured to alter the control signal based at least in part on the system in which the SoC is coupled.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

For the purposes of the present disclosure, the phrases "A and/or B" and "A or B" mean (A), (B), or (A and B). For the purposes of the present disclosure, the phrase "A, B, and/or C" means (A), (B), (C), (A and B), (A and C), (B and C), or (A, B and C).

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

As used herein, the term "circuitry" may refer to, be part of, or include an Application Specific Integrated Circuit (ASIC), an electronic circuit, a processor (shared, dedicated, or group) and/or memory (shared, dedicated, or group) that execute one or more software or firmware programs, a combinational logic circuit, and/or other suitable hardware components that provide the described functionality. As used herein, "computer-implemented method" may refer to any method executed by one or more processors, a computer system having one or more processors, a mobile device such as a smartphone (which may include one or more processors), a tablet, laptop computer, a set-top box, a gaming console, and so forth.

Figure 1:
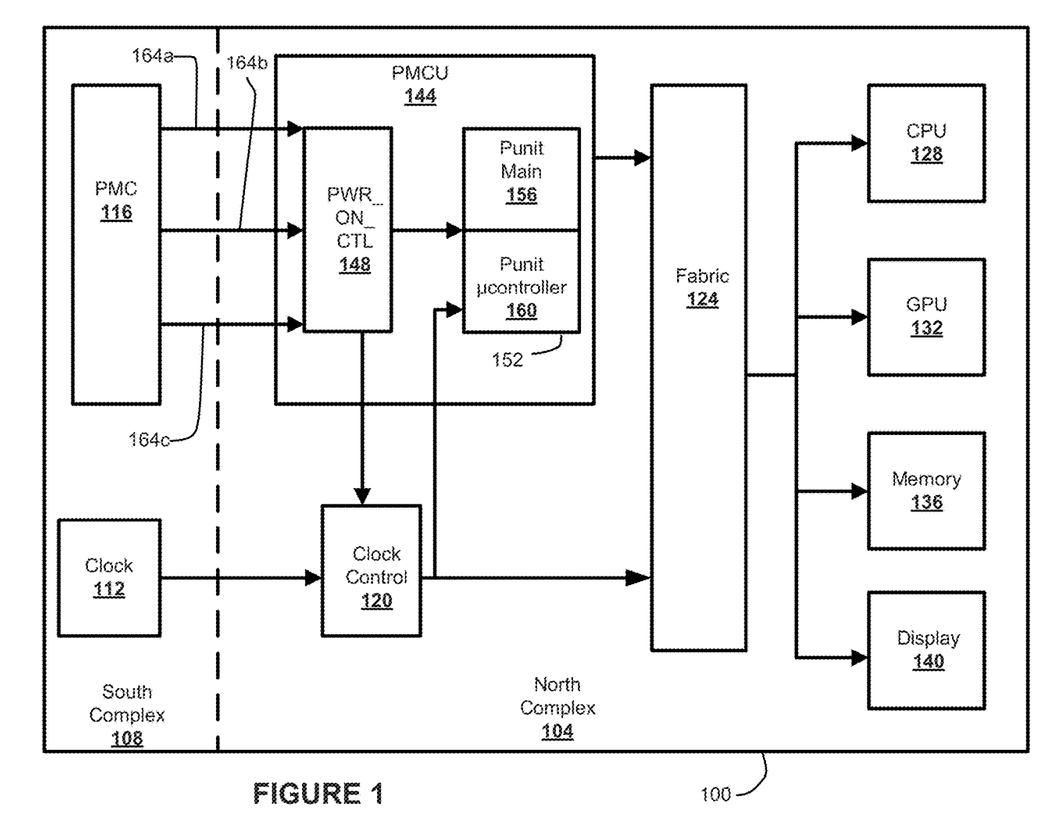
FIG. 1 illustrates an example system on a chip (SoC) architecture, in accordance with various embodiments.

FIG. 1 depicts an example of a system on a chip (SoC) 100. The SoC 100 may include a north complex 104 and a south complex 108. The south complex 108 may include one or more components such as a clock 112 and a power management controller (PMC) 116.

The north complex 104 may include one or more components such as a clock control block 120, and a fabric 124, which may include one or more interconnects, and in some embodiments may be referred to as an interconnect. The north complex 104 may additionally include one or more of a central processing unit (CPU) 128, a graphics processing unit (GPU) 132, a memory 136, and/or a display block 140. Although the term CPU will be used herein to refer to CPU 128, in other embodiments the CPU may be referred to as a "processor" or an "application processor." In some embodiments, the memory 136 may be a non-volatile memory (NVM) such as read only memory (ROM) or flash memory, or a volatile memory such as a dynamic random access memory (DRAM). In embodiments described herein, the clock control block 120, fabric 124, CPU 128, GPU 132, memory 136, display 140, and PMCU 144 may be collectively referred to as "components" of the north complex 104. In some embodiments, one or more of the components may be integrated with one another. For example, the GPU 132 and the display block 140 may be integrated with one another. Additionally, in other embodiments, the north complex 104 may include one or more additional or alternative components. In some embodiments, even though a single component such as a single CPU 128 is shown, in some embodiments the north complex 104 may include a plurality of CPUs such as CPU 128. In some embodiments, the clock control block 120 may be coupled with the clock 112 of the south complex 108, and configured to receive a clock reference signal from the clock 112 to which the clock control block 120 can synchronize one or more signals of the north complex 104 as discussed in greater detail below.

In some embodiments, the north complex 104 may additionally include a power management control unit (PMCU) 144. In some embodiments, the PMCU may include a power-on control block (PWR_ON_CTL) 148. The PWR_ON_CTL block 148 may be coupled with a power unit 152 that may include a main processing portion (Punit Main) 156 and a microcontroller (Punit μcontroller) 160. As shown in FIG. 1, in some embodiments the PMCU 144 may be configured to receive one or more signals from the PMC 116 by way of communication links 164a, 164b, and 164c, as discussed in greater detail below. Additionally, the PMCU 144, and specifically the microcontroller 160, may be configured to receive a clock reference signal from the clock control block 120. One or both of the PMCU 144 and the clock control block 120 may be configured to communicate to one or more of the fabric 124 and, through the fabric, to the CPU 128, GPU 132, memory 136, and/or display 140.

In embodiments, the microcontroller 160 may be configured with one or more input signal parameters. For example, the microcontroller 160 may be configured to only accept an input signal at a certain frequency, or with a certain voltage. In some legacy SoCs, these input signal requirements of the microcontroller 160 may require only a specific type of signal from, for example, a PMC 116 of a south complex 108. Therefore, a specific south complex 108 may only be compatible with a specific north complex 104.

However, in embodiments of the present disclosure, the PWR_ON_CTL block 148 may be configured to interface with the PMC 116. For example, the PMC 116 may be communicatively coupled with the north complex 104, and specifically the PMCU 144, via three communication links 164a, 164b, and 164c. In embodiments, the communication links may include "pins" that communicatively coupled the PMC 116 to the PWR_ON_CTL block 148.

Each of the communication links 164*a*, 164*b*, and 164*c* may be configured to carry a signal that may be, for example, a binary signal. As an example, communication link 164*a* may be configured to carry a power signal that may be referred to as a "host_pwrgood" signal. The host_pwrgood signal may be a signal indicating that the SoC 100 is in an electrically stable condition, and the north complex 104 is receiving power. Specifically, assertion of the host_pwrgood signal, which may correspond to a logical value of "1" on the communication link 164*a*, may indicate that different power rails to the SoC 100 are stable and providing power to the SoC 100. Additionally, assertion of the host_pwrgood signal may additionally indicate that the clock control block 120 has completed a phase lock loop (PLL), and the reference clock signals provided by the clock control block 120 are stable and valid. Additionally, the host_pwrgood signal may indicate to the PWR_ON_CTL block 148 that the PWR_ON_CTL block 148 should begin one or one or more contention processes between one or more of the components of the north complex 104 for resources such as specific memory access, power access, communication timing protocols, or other resources of the north complex 104. By contrast, a logical value of "0" on the communication link 164*a* may indicate that the SoC 100, and specifically the north complex 104, are not in an electrically stable or valid state.

Communication link 164*b* may be configured to carry a signal that may be referred to as a "host_rst_b" signal, and may otherwise be referred to as a reset signal. The host_rst_b signal may indicate that the configuration of the north complex 104 is complete, and that one or more components of the north complex 104 may be required to perform one or more logical functions. Specifically, assertion of the host_rst_b signal, which may correspond to a logical value of "1" on the communication link 164*b*, may indicate that the north complex should start execution. In some embodiments, The south complex 108 may ensure that sufficient time is provided between assertion of the host_pwrgood signal and assertion of the host_rst_b signal. This south complex may ensure that sufficient time is provided between the signals by using a reset timer on the PMC 116. In general, the reset timer may be configured to be sufficient for preparation of the Punit 152 in specific, and generally the north complex 104 to be completed after the north complex 104 receives the host_pwrgood signal, such that a reset of the north complex 104 may be accomplished upon receipt of a host_rst_b signal. In some embodiments, the reset process may be implemented by firmware of the Punit 152, and specifically the microcontroller 160. By contrast, a logical value of "0" on the communication link 164*b* may indicate that no logic functionality of the north complex 104 is expected or that a warm reset condition should be initiated.

Communication link 164*c* may be configured to carry a signal that may be referred to as a "host_stdby" signal and may otherwise be referred to as a standby signal. The host_stdby signal may indicate that the north complex 104, or one or more components of the north complex 104, is to enter a low power mode that may be referred to as a "standby" mode or a "sleep" mode. Specifically, assertion of the host_stdby signal, which may correspond to a logical "1" on the communication link 164*c*, may indicate that the north complex 104, or one or more components of the north complex 104, should prepare for, or otherwise perform, voltage gating. The host_stdby signal may be used to isolate one or more of the voltage rails that provide voltage to the SoC 100, and may be generated or otherwise driven by the PMC 116 and/or the south complex 108. In some embodiments, a logical "0" on the communication link 164*c* may indicate normal system functionality. In embodiments, a logical "1" on communication link 164*a* may correspond to a logical "0" on communication link 164*c*, or vice-versa.

In embodiments, the PWR_ON_CTL block 148 may be configured to receive one or more of the signals from the PMC 116 on communication links 164*a*, 164*b*, or 164*c*. As discussed above, the signals may correspond to a logical "1" or a logical "0," but the values provided above are only examples. In some embodiments the logical values of one or more of the communication links 164*a*, 164*b*, or 164*c* may be reversed from those described above. For example, in some embodiments the logical value of "0" on the communication link 164*a* may indicate the assertion of the host_pwrgood signal, while the logical value of "1" may not indicate the assertion of the host_pwrgood signal.

In embodiments, the logical value of "1" may be indicated on communication links 164*a*, 164*b*, or 164*c* by a signal at a first voltage being received at the PWR_ON_CTL block 148. The logical value of "0" may be indicated on communication links 164*a*, 164*b*, or 164*c* by a signal at a second voltage being received at the PWR_ON_CTL block 148. The first voltage may be, for example 1 Volt, while the second voltage may be, for example 0.5 Volts. A change in the voltage of the signal may indicate a change in the logical value of the communication link 164*a*, 164*b*, or 164*c*. The above described voltages are merely examples, and other voltages may be used in other embodiments.

In some embodiments, the PWR_ON_CTL block 148 may also be configured to identify one or more of the input signal requirements of the microcontroller 160 and/or the system in which the SoC 100 is implemented. For example, components of a system such as a desktop device may have a different signal, frequency, voltage, or clock requirement than a phone or tablet.

The PWR_ON_CTL block 148 may therefore be configured to alter or otherwise translate one or more of the signals received on communication links 164*a*, 164*b*, or 164*c* to conform to the input signal requirements of the microcontroller 160 and/or the system in which the SoC 100 is implemented. For example, if the microcontroller 160 has a specific voltage and/or frequency requirement for an input signal, the PWR_ON_CTL block 148 may be configured to alter or otherwise translate the signal received from the PMC 116 to conform to the voltage and/or frequency requirements of the microcontroller 160, as described above. For example, as shown in FIG. 1 the PMCU 144, and specifically the PWR_ON_CTL block 148 may be configured to transmit a signal to the clock control block 120. The signal transmitted to the clock control block 120 may include instructions or indications of how the clock control block 120 should format the frequency or voltage of signals transmitted to the microcontroller 160 to conform to the specific input signal requirements of the microcontroller 160.

Alternatively, if the signal is the host_pwrgood signal received on communication link 164*a*, then the PWR_ON_CTL block 148 may be configured to send one or more signals to one or more components of the north complex 104 to prepare the components for a logical function. In other words, the host_pwrgood signal may not indicate the necessary configuration, or even the presence, of one or more of the components of the north complex 104. However, the PWR_ON_CTL block 148 may have access to the necessary configuration settings, or identification of the components, and be configured to transmit the necessary signals to one or more of the fabric 124, the CPU 128, the GPU 132, the memory 136, the display 140, and/or the clock control 120.

By providing these translation functions, the PWR_ON_CTL block 148 may generally act as a translator to allow a desirable south complex 108 to communicate with a desirable north complex 104 in an SoC 100, even if the south complex 108 and the north complex 104 may not have matching control structures.

Figure 2:
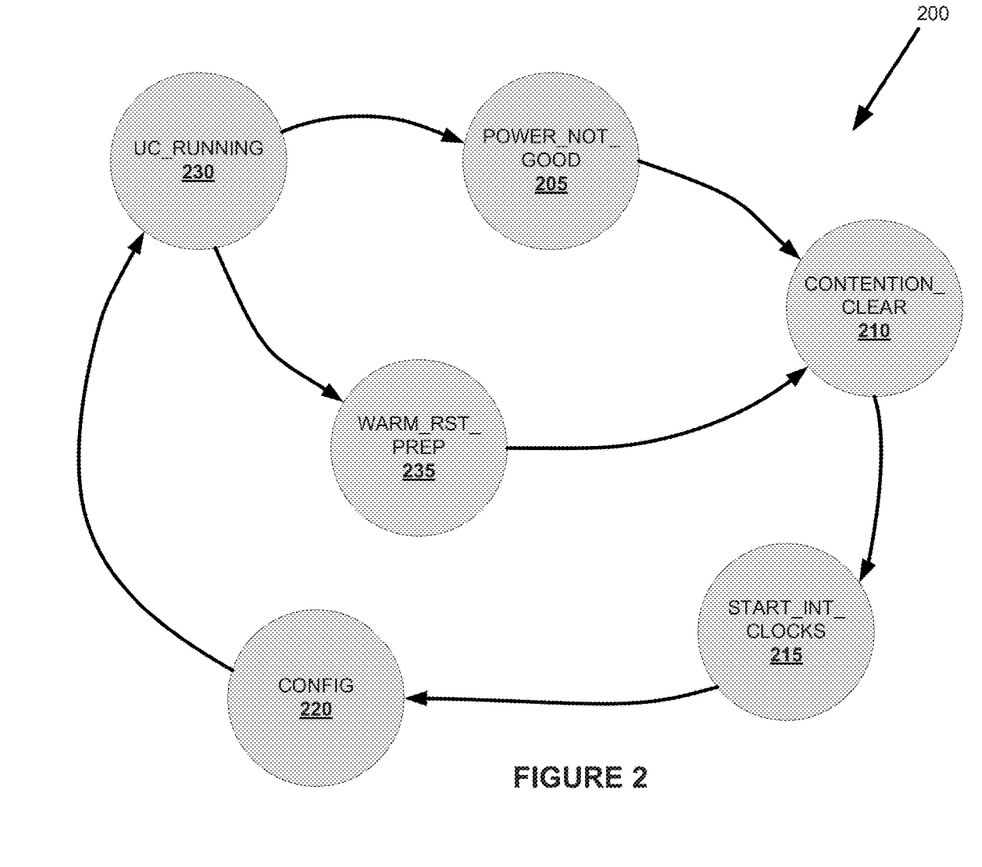
FIG. 2 illustrates an example finite state machine (FSM) diagram for a power-on control block of north complex, in accordance with various embodiments.

FIG. 2 is a finite state diagram (FSM) that shows one possible process flow for the PWR_ON_CTL block 148. Initially, communication link 164a may carry a logical value of "0," which may indicate that the host_pwrgood signal is negative. The PWR_ON_CTL block 148 may therefore be considered to be in a POWER_NOT_GOOD state at 205.

The logical value of the communication link 164a may change to carry a logical value of "1," which may indicate assertion of the host_pwrgood signal. As discussed above, the host_pwrgood signal may indicate that the SoC 100, and specifically the north complex 104, are stable and receiving power. In response to the assertion of the host_pwrgood signal, the PWR_ON_CTL block 148 may begin the contention process as discussed above. Specifically, the PWR_ON_CTL block 148 may transmit one or more signals directly to one or more of the components of the north complex 104 to set a specific state of the component, or perform a specific contention process. For example, the PWR_ON_CTL block 148 may transmit one or more indications to one or more of the components of the north complex 104 to indicate that the components should transmit signals corresponding to a specific voltage or frequency requirement of the microcontroller 160, the north complex 104 in general, or the system or device in which the SoC 100 is implemented. For example, if the SoC 100 is being implemented in a specific system such as a phone or a tablet, then the PWR_ON_CTL block 148 may instruct a component such as a CPU 128 to operate according to one or more specific frequency, voltage, or clock parameters. The PWR_ON_CTL block 148 may then be in a CONTENTION_CLEAR state 210.

The PWR_ON_CTL block 148 may then generate a signal indicating that the power-up and/or relevant contention processes are complete. The signal may be, for example, a "pwrupdone" signal. In some cases, the PWR_ON_CTL block 148 may receive the pwrupdone signal from one or more of the components of the north complex 104. Based on the pwrupdone signal, the PWR_ON_CTL block 148 may proceed into the START_INT_CLOCKS state at 215. Specifically, the PWR_ON_CTL block 148 may configure the clock control block 120 to conform to a specific timing characteristic such as a frequency, or a power characteristic such as an output voltage requirement, of the microcontroller 160, the north complex 104, and/or the system in which the SoC 100 is implemented.

After the internal clocks are started, the PWR_ON_CTL block 148 may generate an indication that the internal clocks have been started. The signal may be, for example, a "int_clocks_done" signal. In some embodiments, the PWR_ON_CTL block 148 may receive the signal from, for example, the clock control 120. In response to the int_clocks_done signal, the PWR_ON_CTL block 148 may move to the CONFIG state at 220. In the CONFIG state, the PWR_ON_CTL block 148 may communicate with the microcontroller 160 and one or more of the components of the north complex 104 to configure the microcontroller 160 and the different components of the north complex 104. For example, the PWR_ON_CTL block 148 may provide an indication to the microcontroller of the different components of the north complex 104. Additionally or alternatively, the PWR_ON_CTL block 148 may provide an indication to the microcontroller of specific power or timing requirements of the system in which the SoC 100 is implemented.

As noted above, in some embodiments, the PWR_ON_CTL block 148 may configure one or more of the components of the north complex 104. For example, in some embodiments the CPU 128 may include multiple processing cores, but the system in which the SoC 104 is implemented may only require a single core of the CPU 128. Therefore, the PWR_ON_CTL block 148 may configure the CPU 128 to only use a single core. The above examples are merely a subset of the different processes or configuration settings that may be performed by the PWR_ON_CTL block 148 during the CONFIG process at 220. Additional or alternative configuration processes or settings involving the microcontroller 160 or other components of the north complex 104 may be performed in other embodiments.

After the configuration processes of the CONFIG state are complete at 220, the PWR_ON_CTL block 148 may move into the UC_RUNNING state at 230 indicating that the microcontroller 160 is running. Specifically, after the configuration processes are complete, the various components of the north complex 104, including the microcontroller 160, may be configured to operate and perform one or more logical processes. Additionally, the logical value of communication link 164b may be equal to 0, indicating that the host_rst_b signal is not being asserted. Therefore, because the various components of the north complex 104, including the microcontroller 160, are configured to perform the logical processes, and a reset signal is not being asserted, then the PWR_ON_CTL block 148 may be in the UC_RUNNING state at 230.

The PWR_ON_CTL block 148 may remain in the UC_RUNNING state at 230 until the PWR_ON_CTL block 148 returns to the POWER_NOT_GOOD state at 205, or the WARM_RST_PREP state at 235. For example, the PWR_ON_CTL block may receive a signal on communication link 164a that corresponds to a logical "0." This logical "0" on communication link 164a may indicate that the host_pwrgood signal is not being asserted by the PMC 116. Therefore, the PWR_ON_CTL block 148 may return to the POWER_NOT_GOOD state at 205.

Alternatively, the PWR_ON_CTL block 148 may receive a signal on communication link 164b that corresponds to a logical "1," indicating that the host_rst_b signal is being asserted. Therefore, the PWR_ON_CTL block 148 may move into the WARM_RST_PREP state where it begins a reset process as described above with respect to FIG. 1. Specifically, the PWR_ON_CTL block 148 may transmit a reset signal to the microcontroller 160, which causes the microcontroller 160 to initiate the firmware that performs the reset process. The reset process may include, for example, the microcontroller 160 and/or one or more of the components of the north complex 104. At the conclusion of the reset process, the PWR_ON_CTL block 148 may generate a "reset_timer_expired" message that indicates that the reset process has completed. Specifically, the reset_timer_expired message may indicate that a reset timer of the PWR_ON_CTL block 148 has expired and the reset process should be complete. For example, the reset process may be configured to be performed within a specific time frame encompassed by the reset timer. Alternatively, the reset timer may be a reset timer of the microcontroller 160, and the PWR_ON_CTL block 148 may receive the reset_timer_expired message from the microcontroller 160. As a result of the reset_timer_expired message, the PWR_ON_CTL block 148 may move to the CONTENTION_CLEAR state at 210.

The discussion of the names or descriptions of different signals is intended to provide only an example of one embodiment. In other embodiments, the FSM 200 may include one or more additional states or signals. In some embodiments, certain states such as the START_INT_CLOCKS at 215 and the CONFIG at 220 may be combined with one another. In some embodiments, certain reference signals may have different names or logical values, or may be performed in a different order.

Figure 3:
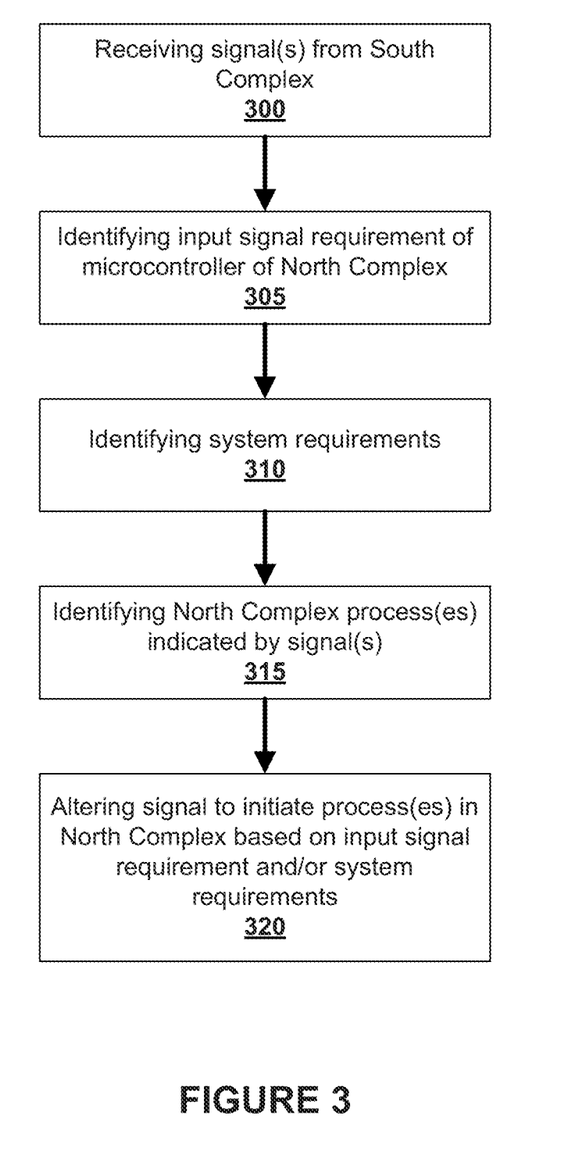
FIG. 3 illustrates an example process of a power-on control block of a north complex, in accordance with various embodiments.

FIG. 3 depicts a generalized process of the PWR_ON_CTL block 148. Initially, the PWR_ON_CTL block 148 may receive one or more signals from the south complex 108, and specifically the PMC 116, at 300. The signals may include an assertion of the host_pwrgood signal, the host_rst_b signal, and/or a host_stdby signal received on, for example, communication links 164a, 164b, and/or 164c.

The PWR_ON_CTL block 148 may then identify an input signal requirement of the microcontroller 160 of the north complex 104 at 305. For example the PWR_ON_CTL block 148 may identify a specific voltage requirement, signal frequency or timing requirement, or some other requirement of the microcontroller 160 with regards to the input signal. The PWR_ON_CTL block 148 may additionally identify one or more requirements of the system in which the SoC 100 is implemented at 310. As discussed above, the requirements may include an enablement of a specific CPU core, memory resource allocations, clock speed, voltage requirements, or some other requirement of the system. For example, as discussed above, a desktop computing system may have different system requirements than, for example, a phone or tablet system.

The PWR_ON_CTL block 148 may then identify the specific process or processes indicated by the signal(s) received at 300. Specifically, the PWR_ON_CTL block 148 may identify whether the signal is a host_stdby signal that indicates that the north complex 104 should enter a low power mode, a host_rst_b signal that indicates a system reset of one or more of the components of the north complex 104, or a host_pwrgood signal that indicates that the north complex 104 is receiving power, as described above.

The PWR_ON_CTL block 148 may then alter the signals received at 300 to initiate the one or more processes identified at 315 based on one or more of the input signal requirement identified at 305 and/or the system requirements identified at 310. For example, if the signal is a host_rst_b signal, the PWR_ON_CTL block 148 may alter the signal to conform to the specific input signal requirements of the microcontroller 160, and pass the signal to the microcontroller 160. Alternatively, if the signal received at 305 is a host_pwrgood signal, then the PWR_ON_CTL block 148 may move to the CONTENTION_CLEAR state 210 as described above with respect to FIG. 2. The above specific actions are just examples and the PWR_ON_CTL block 148 may perform one or more of the other processes or actions described above with respect to FIGS. 1 and 2 at 320.

Figure 4:
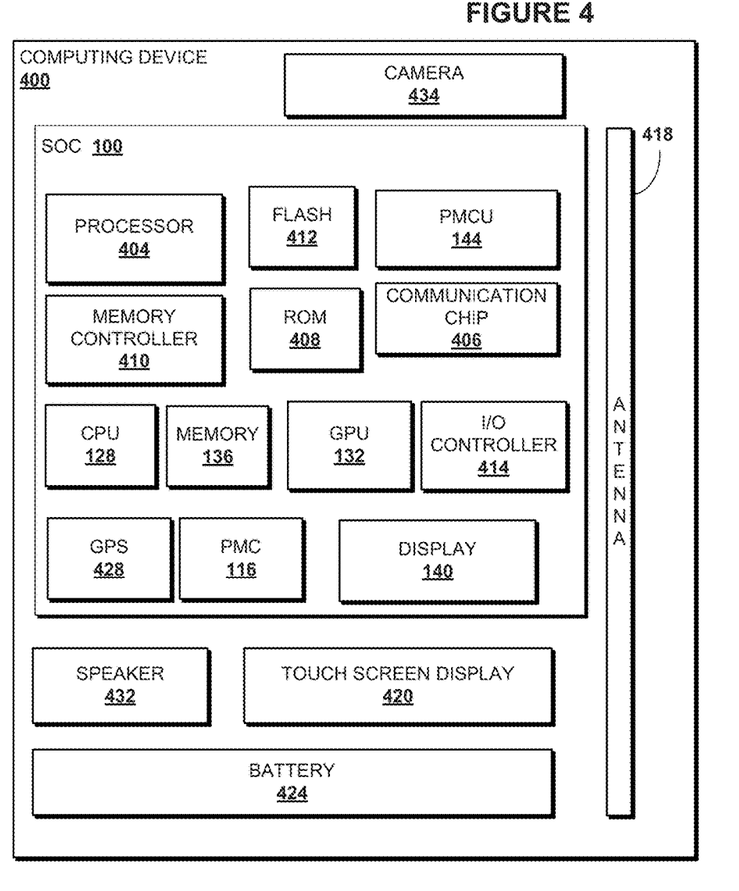
FIG. 4 illustrates an example system configured to perform the processes described herein, in accordance with various embodiments.

FIG. 4 illustrates an example computing device 400 in which systems such as the earlier described SoC 100 may be incorporated, in accordance with various embodiments. Computing device 400, and specifically SoC 100 may include a number of components, such as CPU 128, memory 136, GPU 132, and display 140, PMCU 144, one or more additional processor(s) 404, and at least one communication chip 406, as described above.

In various embodiments, the processor 404, CPU 128, and GPU 132 may each include one or more processor cores. In various embodiments, the at least one communication chip 406 may be physically and electrically coupled to the one or more processor(s) 404 or CPU 128. In further implementations, the communication chip 406 may be part of the one or more processor(s) 404 or CPU 128.

Depending on its applications, computing device 400 may include other components that may or may not be physically and electrically coupled to the SoC 100. These other components include, but are not limited to, volatile memory (not shown), non-volatile memory such as ROM 408, an I/O controller 414, a digital signal processor (not shown), a crypto processor (not shown), a memory controller 410, one or more antenna 418, a touch screen display 420, a touch screen controller (not shown), a battery 424, an audio codec (not shown), a video codec (not shown), a global positioning system (GPS) device 428, a compass (not shown), an accelerometer (not shown), a gyroscope (not shown), a speaker 432, a camera 434, and a mass storage device (such as hard disk drive, a solid state drive, compact disk (CD), digital versatile disk (DVD)) (not shown), and so forth. In embodiments, one or both of the DRAM memory 136 and/or the ROM 408 may be or may include a cross-point non-volatile memory. In embodiments, the battery 424 may be coupled with the SoC 100 and configured to provide a voltage to the SoC 100 such as the voltage of the input signal of the microcontroller 160.

In various embodiments, computing device 400, and specifically SoC 100 may include resident persistent or non-volatile memory, e.g., flash memory 412. In some embodiments, the one or more processor(s) 404, CPU 128, PMCU 144, PMC 116, and/or flash memory 412 may include associated firmware (not shown) storing programming instructions configured to enable computing device 400, in response to execution of the programming instructions by one or more processor(s) 404, CPU 128, PMCU 144 or PMC 116, or receipt of a signal transmitted by the PMC 116, to practice all or selected aspects of the blocks described above with respect to FIG. 4.

The communication chips 406 may enable wired and/or wireless communications for the transfer of data to and from the computing device 400. The term "wireless" and its derivatives may be used to describe circuits, devices, systems, methods, techniques, communications channels, etc., that may communicate data through the use of modulated electromagnetic radiation through a non-solid medium. The term does not imply that the associated devices do not contain any wires, although in some embodiments they might not. The communication chip 406 may implement any of a number of wireless standards or protocols, including but not limited to IEEE 802.20, General Packet Radio Service (GPRS), Evolution Data Optimized (Ev-DO), Evolved High Speed Packet Access (HSPA+), Evolved High Speed Downlink Packet Access (HSDPA+), Evolved High Speed Uplink Packet Access (HSUPA+), Global System for Mobile Communications (GSM), Enhanced Data rates for GSM Evolution (EDGE), Code Division Multiple Access (CDMA), Time Division Multiple Access (TDMA), Digital Enhanced Cordless Telecommunications (DECT), Bluetooth, derivatives thereof, as well as any other wireless protocols that are designated as 3G, 4G, 5G, and beyond. The computing device 400 may include a plurality of communication chips 406. For instance, a first communication chip 406 may be dedicated to shorter range wireless communications such as Wi-Fi and Bluetooth and a second communication chip 406 may be dedicated to longer range wireless communications such as GPS, EDGE, GPRS, CDMA, WiMAX, LTE, Ev-DO, and others.

In various implementations, the computing device 400 may be a laptop, a netbook, a notebook, an ultrabook, a smartphone, a computing tablet, a personal digital assistant (PDA), an ultra mobile PC, a mobile phone, a desktop computer, a server, a printer, a scanner, a monitor, a set-top box, an entertainment control unit (e.g., a gaming console), a digital camera, a portable music player, or a digital video recorder. In further implementations, the computing device 500 may be any other electronic device that processes data.

In embodiments, a first example of the present disclosure may include an apparatus comprising: a microcontroller in a north complex, the microcontroller with an input signal requirement; and a power-on control block coupled with the microcontroller, the power-on control block configured to receive a control signal from a component of a south complex and alter the control signal to provide an input signal based at least in part on the input signal requirement of the microcontroller.

Example 2 may include the apparatus of example 1, wherein the input signal requirement is an input signal frequency requirement or an input signal voltage requirement of the microcontroller.

Example 3 may include the apparatus of example 1, wherein the control signal is a reset signal, a standby signal, or a power signal.

Example 4 may include the apparatus of example 3, wherein the control signal is the reset signal, and the input signal is an indication to begin a reset process.

Example 5 may include the apparatus of any of examples 1-4, further comprising a clock control block coupled with the power management control unit.

Example 6 may include the apparatus of any of examples 1-4, wherein the apparatus is coupled with one or more components of the north complex.

Example 7 may include the apparatus of example 6, wherein the power-on control block is further configured to alter the control signal based at least in part on a configuration of the one or more components of the north complex.

Example 8 may include a method comprising: receiving, at a power-on control block of a north complex, a control signal from a power management controller (PMC) in a south complex; and altering, at the power-on control block, the control signal based at least in part on an input signal requirement of a microcontroller of the north complex.

Example 9 may include the method of example 8, wherein the input signal requirement is an input signal frequency requirement or an input signal voltage requirement of the microcontroller.

Example 10 may include the method of examples 8 or 9, wherein the control signal is a reset signal, a standby signal, or a power signal.

Example 11 may include the method of example 10, wherein the control signal is the reset signal, and the method further comprises transmitting, to the microcontroller, an altered reset signal that conforms to the input signal requirement of the microcontroller.

Example 12 may include the method of example 11, wherein the reset signal indicates that the microcontroller should initiate a system reset of one or more components of the north complex.

Example 13 may include the method of example 10, wherein the control signal is the power signal, which is to provide an indication that the north complex is receiving power.

Example 14 may include the method of example 10, wherein the control signal is the standby signal, which is to provide an indication that the north complex should enter a low power mode.

Example 15 may include a system comprising: a south complex including a power management controller (PMC); a north complex communicatively coupled with the south complex, wherein the north complex includes: a microcontroller with an input signal requirement; and a power-on control block coupled with the microcontroller, the power-on control block configured to receive a control signal from the PMC and alter the control signal to provide an input signal based at least in part on the input signal requirement of the microcontroller.

Example 16 may include the system of example 15, wherein the input signal requirement is an input signal frequency requirement or an input signal voltage requirement of the microcontroller.

Example 17 may include the system of example 15, wherein the control signal is a reset signal, a standby signal, or a power signal.

Example 18 may include the system of example 17, wherein the control signal is the reset signal, and the input signal is an indication to begin a reset process.

Example 19 may include the system of any of examples 15-18, further comprising a clock control block coupled with the power management control unit.

Example 20 may include the system of any of example 15-18, wherein the system is a system on chip (SoC).

Example 21 may include an apparatus comprising: means to receive, at a power-on control block of a north complex, a control signal from a power management controller (PMC) in a south complex; and means to alter, at the power-on control block, the control signal based at least in part on an input signal requirement of a microcontroller of the north complex.

Example 22 may include the apparatus of example 21, wherein the input signal requirement is an input signal frequency requirement or an input signal voltage requirement of the microcontroller.

Example 23 may include the apparatus of examples 21 or 22, wherein the control signal is a reset signal, a standby signal, or a power signal.

Example 24 may include the apparatus of example 23, wherein the control signal is the reset signal, and the apparatus further comprises means to transmit, to the microcontroller, an altered reset signal that conforms to the input signal requirement of the microcontroller.

Example 25 may include the apparatus of example 24, wherein the reset signal indicates that the microcontroller should initiate a system reset of one or more components of the north complex.

Example 26 may include the apparatus of example 23, wherein the control signal is the power signal, which is to provide an indication that the north complex is receiving power.

Example 27 may include the apparatus of example 23, wherein the control signal is the standby signal, which is to provide an indication that the north complex should enter a low power mode.

Example 28 may include one or more non-transitory computer readable media comprising instructions configured, upon execution of the instructions by a computing device, to: receive, at a power-on control block of a north complex, a control signal from a power management controller (PMC) in a south complex; and alter, at the power-on control block, the control signal based at least in part on an input signal requirement of a microcontroller of the north complex.

Example 29 may include the one or more non-transitory computer readable media of example 28, wherein the input signal requirement is an input signal frequency requirement or an input signal voltage requirement of the microcontroller.

Example 30 may include the one or more non-transitory computer readable media of examples 28 or 29, wherein the control signal is a reset signal, a standby signal, or a power signal.

Example 31 may include the one or more non-transitory computer readable media of example 30, wherein the control signal is the reset signal, and further comprising instructions to transmit, to the microcontroller, an altered reset signal that conforms to the input signal requirement of the microcontroller.

Example 32 may include the one or more non-transitory computer readable media of example 31, wherein the reset signal indicates that the microcontroller should initiate a system reset of one or more components of the north complex.

Example 33 may include the one or more non-transitory computer readable media of example 30, wherein the control signal is the power signal, which is to provide an indication that the north complex is receiving power.

Example 34 may include the one or more non-transitory computer readable media of example 30, wherein the control signal is the standby signal, which is to provide an indication that the north complex should enter a low power mode.

Example 35 may include the system of example 15, wherein a voltage of the input signal is supplied at least in part by a battery coupled with the system.

Although certain embodiments have been illustrated and described herein for purposes of description, this application is intended to cover any adaptations or variations of the embodiments discussed herein. Therefore, it is manifestly intended that embodiments described herein be limited only by the claims.

Where the disclosure recites "a" or "a first" element or the equivalent thereof, such disclosure includes one or more such elements, neither requiring nor excluding two or more such elements. Further, ordinal indicators (e.g., first, second or third) for identified elements are used to distinguish between the elements, and do not indicate or imply a required or limited number of such elements, nor do they indicate a particular position or order of such elements unless otherwise specifically stated.

What is claimed is:

1. An integrated circuit (IC) die comprising:
a microcontroller and one or more components coupled to the microcontroller, the microcontroller with an input signal requirement;
a clock control block to provide a clock signal to the microcontroller; and
a power-on control block coupled with the microcontroller and the clock control block, the power-on control block to:
receive a control signal, from a source external to the power-on control block and disposed on the IC die, to control one or more of the one or more components via the microcontroller; and
alter the control signal to provide an input signal to the microcontroller that complies with the input signal requirement of the microcontroller; and
transmit a signal to the clock control block to indicate to the clock control block how the clock signal provided from the clock control block to the microcontroller is to be formatted to comply with the input signal requirement of the microcontroller.

2. The IC die of claim 1, wherein the input signal requirement is an input signal frequency or voltage requirement.

3. The IC die of claim 2, wherein the signal sent by the power-on control block to the clock control block is to indicate how a frequency or voltage of the clock signal is to be adjusted to conform to the input signal frequency or voltage requirement.

4. The IC die of claim 1, wherein the control signal is a reset signal, a standby signal, or a power signal.

5. The IC die of claim 4, wherein the control signal is the reset signal, and the input signal is an indication to begin a reset process.

6. The IC die of claim 1, wherein the one or more components include one or more of a central processing unit (CPU), a graphics processing unit (GPU), a memory, or a display block.

7. The IC die of claim 1, wherein the control signal is to control a configuration of one or more of the one or more components.

8. The IC die of claim 1, wherein the power-on control block is further to alter the control signal based at least in part on a present configuration of the one or more components.

9. The IC die of claim 1, wherein the clock control block is further to provide the clock signal to the one or more components.

10. The IC die of claim 1, wherein the control signal received by the power-on control block from the source is asynchronous.

11. The IC die of claim 1, wherein the source is a power management controller (PMC).

12. A method comprising:
receiving, by a power-on control block, a control signal from a power management controller (PMC); and
altering, by the power-on control block, the control signal to comply with an input signal requirement of a microcontroller;
passing the altered control signal to the microcontroller; and
sending, by the power-on control block, a signal to a clock control block to indicate to the clock control block how a clock signal provided from the clock control block to the microcontroller is to be formatted to comply with the input signal requirement;
wherein the power-on control block, the power management controller (PMC), the microcontroller, and the clock control block are disposed on a same integrated circuit (IC) die.

13. The method of claim 12, further comprising:
controlling, by the microcontroller, a configuration of one or more components of the IC die based on the control signal.

14. The method of claim 13, wherein the one or more components include one or more of a central processing unit (CPU), a graphics processing unit (GPU), a memory, or a display block.

15. The method of claim 13, wherein the control signal is a reset signal to indicate that the microcontroller should initiate a system reset of one or more of the one or more components.

16. The method of claim 13, wherein the control signal is a power signal to indicate that a first circuit block that includes the microcontroller and the one or more components is receiving power.

17. The method of claim 13, wherein the control signal is a standby signal to indicate that a first circuit block that includes the microcontroller and the one or more components should enter a low power mode.

18. The method of claim 12, wherein the control signal received by the power-on control block from the PMC is asynchronous.

19. A computer system comprising:
a circuit board;
a system-on-chip (SoC) coupled to the circuit board, the SoC including:
 a power management controller (PMC);
 a microcontroller with an input signal requirement;
 one or more components coupled to and controllable by the microcontroller;
 a clock control block to provide a clock signal to the microcontroller; and
 a power-on control block coupled with the microcontroller, wherein the PMC, the microcontroller, the one or more components, the clock control block, and the power-on control block are disposed on a same IC die, and wherein the power-on control block is to:
  receive a control signal from the PMC; and
  alter the control signal to provide an input signal to the microcontroller that complies with the input signal requirement of the microcontroller; and
  transmit a signal to the clock control block to indicate to the clock control block how the clock signal provided from the clock control block to the microcontroller is to be formatted to comply with the input signal requirement.

20. The system of claim 19, wherein the one or more components include one or more of a central processing unit (CPU), a graphics processing unit (GPU), a memory, or a display block.

21. The system of claim 19, wherein the control signal is a reset signal, a standby signal, or a power signal.

22. The system of claim 19, wherein the input signal requirement is an input signal voltage requirement.

23. The system of claim 19, wherein the input signal requirement is an input signal frequency requirement.

24. The system of claim 19, further comprising one or more of a display, an antenna, or a battery coupled to the SoC.

25. The system of claim 24, wherein the system includes the battery, and wherein a voltage of the input signal is supplied at least in part by the battery.

* * * * *